United States Patent
Mazaira et al.

(10) Patent No.: US 10,336,207 B2
(45) Date of Patent: Jul. 2, 2019

(54) ELECTRIFIED VEHICLE ALLOWING USER TO SET BATTERY CHARGING PROFILE IN-VEHICLE

(71) Applicant: Ford Global Technologies, LLC, Dearborn, MI (US)

(72) Inventors: Jordan Mazaira, Dearborn Heights, MI (US); Bryan Michael Bolger, Canton, MI (US); Christopher Adam Ochocinski, Canton, MI (US); Angel Fernando Porras, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 175 days.

(21) Appl. No.: 15/216,978

(22) Filed: Jul. 22, 2016

(65) Prior Publication Data
US 2018/0022228 A1    Jan. 25, 2018

(51) Int. Cl.
*B60L 53/64*   (2019.01)
*B60L 11/18*   (2006.01)
*H02J 7/00*    (2006.01)
*B60L 53/30*   (2019.01)

(52) U.S. Cl.
CPC ......... *B60L 11/1851* (2013.01); *B60L 53/305* (2019.02); *B60L 53/64* (2019.02); *H02J 7/0021* (2013.01); *B60L 2250/16* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC .................................................... B60L 11/1851
USPC .................................................. 320/104, 109
See application file for complete search history.

(56) References Cited

U.S. PATENT DOCUMENTS

| | | |
|---|---|---|
| 2011/0047102 A1 | 2/2011 | Grider et al. |
| 2011/0191265 A1 | 8/2011 | Lowenthal et al. |
| 2011/0224852 A1* | 9/2011 | Profitt-Brown ..... B60L 11/1824 701/22 |
| 2012/0173061 A1 | 7/2012 | Hanley et al. |
| 2013/0096751 A1 | 4/2013 | Riley et al. |
| 2014/0114514 A1 | 4/2014 | Crombez et al. |

OTHER PUBLICATIONS

John O'Dell, www.Edmunds.com article, How to Reduce Electric Car Charging Costs, Dec. 20, 2012.
Ford Motor Co., Itunes App Store, MyFord Mobile, 2016.
Wang, Hu, Qiu, Chu, Gadh, UCLA Article, EV Charging Algorithm Implementation with User Price Preference.

* cited by examiner

*Primary Examiner* — Edward Tso
*Assistant Examiner* — Ahmed H Omar
(74) *Attorney, Agent, or Firm* — Carlson, Gaskey & Olds, P.C.

(57) ABSTRACT

A system according to an exemplary aspect of the present disclosure includes, among other things, an electrified vehicle including a battery pack, a human-machine interface configured to receive inputs setting a charging profile, and a controller. The system further includes a battery system configured to selectively charge the battery pack in response to an instruction from the controller. Further, the controller is configured to instruct the battery system to charge the battery pack consistent with the charging profile.

13 Claims, 12 Drawing Sheets

ELECTRIFIED VEHICLE ALLOWING USER TO SET BATTERY CHARGING PROFILE IN-VEHICLE

BACKGROUND

This disclosure relates to an electrified vehicle having a selectively chargeable battery pack. The electrified vehicle includes a human-machine interface allowing a user to set a battery charging profile in-vehicle.

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack typically powers the electric machines and other electrical loads of the electrified vehicle. The battery pack includes a plurality of battery cells that must be periodically charged to replenish the energy necessary to power these loads. Many electrified vehicle customers desire systems capable of quickly, efficiently, and inexpensively charging the battery pack. Some known systems charge the battery pack by drawing power from an electrical grid. In order to reduce energy costs, some of these systems only charge the battery pack when electricity is relatively inexpensive, such as during the night or other off-peak hours.

SUMMARY

This disclosure relates to an electrified vehicle having a selectively chargeable battery pack. The electrified vehicle includes a human-machine interface allowing a user to set a battery charging profile in-vehicle.

An electrified vehicle according to an exemplary aspect of the present disclosure includes, among other things, a battery pack, a human-machine interface configured to receive inputs setting a charging profile, and a controller. The electrified vehicle further includes a battery system configured to selectively charge the battery pack in response to an instruction from the controller. Further, the controller is configured to instruct the battery system to charge the battery pack consistent with the charging profile.

In a further non-limiting embodiment of the foregoing electrified vehicle, the human-machine interface is configured to receive inputs setting the charging profile based on at least a charging time preference.

In a further non-limiting embodiment of any of the foregoing electrified vehicles, the human-machine interface is configured to receive inputs setting the charging profile based on an electricity cost preference and the charging time preference.

In a further non-limiting embodiment of any of the foregoing electrified vehicles, the human-machine interface includes at least one set of charging windows. The at least one set of charging windows includes a plurality of cells arranged in columns and rows. The columns correspond to charging times and the rows correspond to electricity cost.

In a further non-limiting embodiment of any of the foregoing electrified vehicles, the inputs setting the charging profile include a selection of at least one cell corresponding to a desired charging time and electricity cost.

In a further non-limiting embodiment of any of the foregoing electrified vehicles, the human-machine interface is configured to receive an input of vehicle location.

In a further non-limiting embodiment of any of the foregoing electrified vehicles, the system further comprises a global positioning system (GPS). The control unit instructs the battery system to charge the battery pack based on a charging profile associated with the vehicle location as determined by information from the GPS.

In a further non-limiting embodiment of any of the foregoing electrified vehicles, the human-machine interface displays real-time charging information.

In a further non-limiting embodiment of any of the foregoing electrified vehicles, the battery system is electrically coupled to a power grid.

A method according to an exemplary aspect of the present disclosure includes, among other things, setting a charging profile using a human-machine interface of an electrified vehicle, and charging a battery pack based on the charging profile.

In a further non-limiting embodiment of the foregoing method, the step of setting the charging profile includes setting the charging profile based on at least a charging time preference.

In a further non-limiting embodiment of any of the foregoing methods, the step of setting the charging profile includes setting the charging profile based on an electricity cost preference and the charging time preference.

In a further non-limiting embodiment of any of the foregoing methods, the human-machine interface includes at least one set of charging windows. The at least one set of charging windows includes a plurality of columns and rows. The columns correspond to charging times and the rows correspond to electricity cost.

In a further non-limiting embodiment of any of the foregoing methods, the step of setting the charging profile includes selecting at least one cell by clicking the at least one cell on a touchscreen.

In a further non-limiting embodiment of any of the foregoing methods, the step of setting the charging profile includes selecting a plurality of cells by clicking a cell on a touchscreen and dragging to select additional cells.

In a further non-limiting embodiment of any of the foregoing methods, the method further includes displaying real-time charging information in-vehicle using the human-machine interface.

BRIEF DESCRIPTION OF THE DRAWINGS

In FIG. 6A, the user has selected a first cell.

In FIG. 6B, the user has dragged its hand to a second cell.

In FIG. 6C, the user has dragged its hand to a fourth cell and selected two additional cells.

In FIG. 7A, the user has selected a first cell.

In FIG. 7B, the user has dragged its hand to a second cell.

In FIG. 7C, the user has dragged its hand to a third cell and selected an additional cell.

DETAILED DESCRIPTION

This disclosure relates to an electrified vehicle having a selectively chargeable battery pack. The electrified vehicle includes a human-machine interface allowing a user to set a battery charging profile in-vehicle. Once the charging profile is set, the battery pack is charged consistent with the charging profile, which reduces energy costs. Allowing the user to set the charging profile via the human-machine interface takes advantage of the intuitive, familiar controls of the human-machine interface. Further, the human-machine interface provides real-time charging information, which reduces user confusion as to why the vehicle is charging at a particular time.

Figure 1:
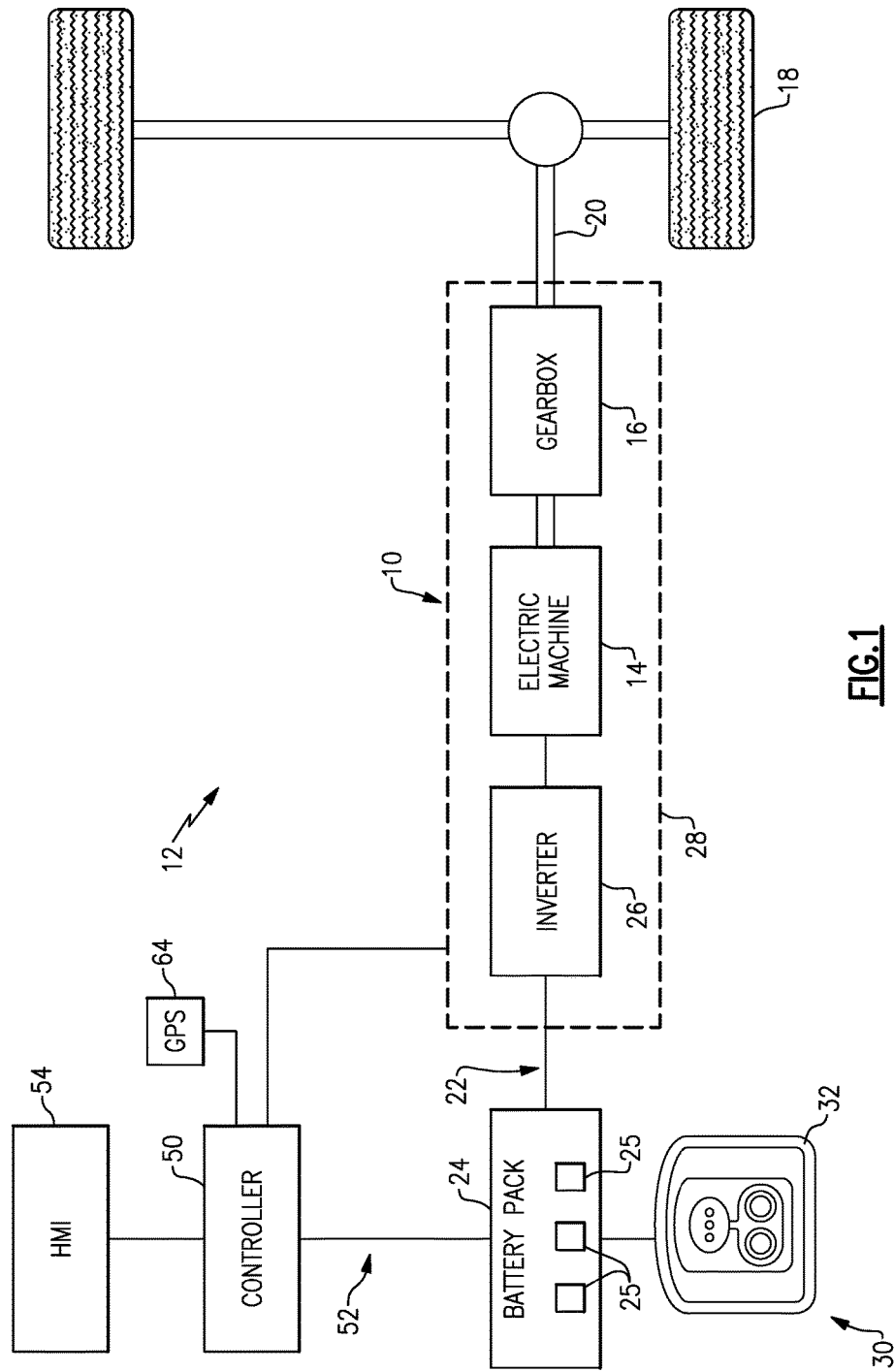
FIG. 1 schematically illustrates a powertrain of an electrified vehicle.

FIG. 1 schematically illustrates a powertrain 10 of an electrified vehicle 12. Although depicted as a battery electric vehicle (BEV), it should be understood that the concepts described herein are not limited to BEVs and could extend to other electrified vehicles, including but not limited to, plug-in hybrid electric vehicles (PHEVs). Therefore, although not shown in this embodiment, the electrified vehicle 12 could be equipped with an internal combustion engine that can be employed either alone or in combination with other energy sources to propel the electrified vehicle 12.

In a non-limiting embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 may collectively be referred to as a transmission 28.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 may also include a charging system 30 for periodically charging the energy storage devices (e.g., battery cells) of the battery pack 24. The charging system 30 may be connected to an external power source, such as a grid power source 48 (FIG. 2), for receiving and distributing power to the energy storage devices. For example, in one non-limiting embodiment, the charging system 30 includes a charging port 32 located on-board the electrified vehicle 12. The charging port 32 is adapted to selectively receive power from the external power source, such as from a power cable connected to the external power source, and then distribute the power to the battery pack 24 for charging the energy storage devices.

The charging system 30 may also be equipped with power electronics used to convert AC power received from the external power supply to DC power for charging the energy storage devices of the battery pack 24. The charging system 30 may also accommodate one or more conventional voltage sources from the external power supply (e.g., 110 volt, 220 volt, etc.).

The powertrain 10 shown in FIG. 1 is highly schematic and is not intended to limit this disclosure. Various additional components could alternatively or additionally be employed by the powertrain 10 within the scope of this disclosure.

Figure 2:
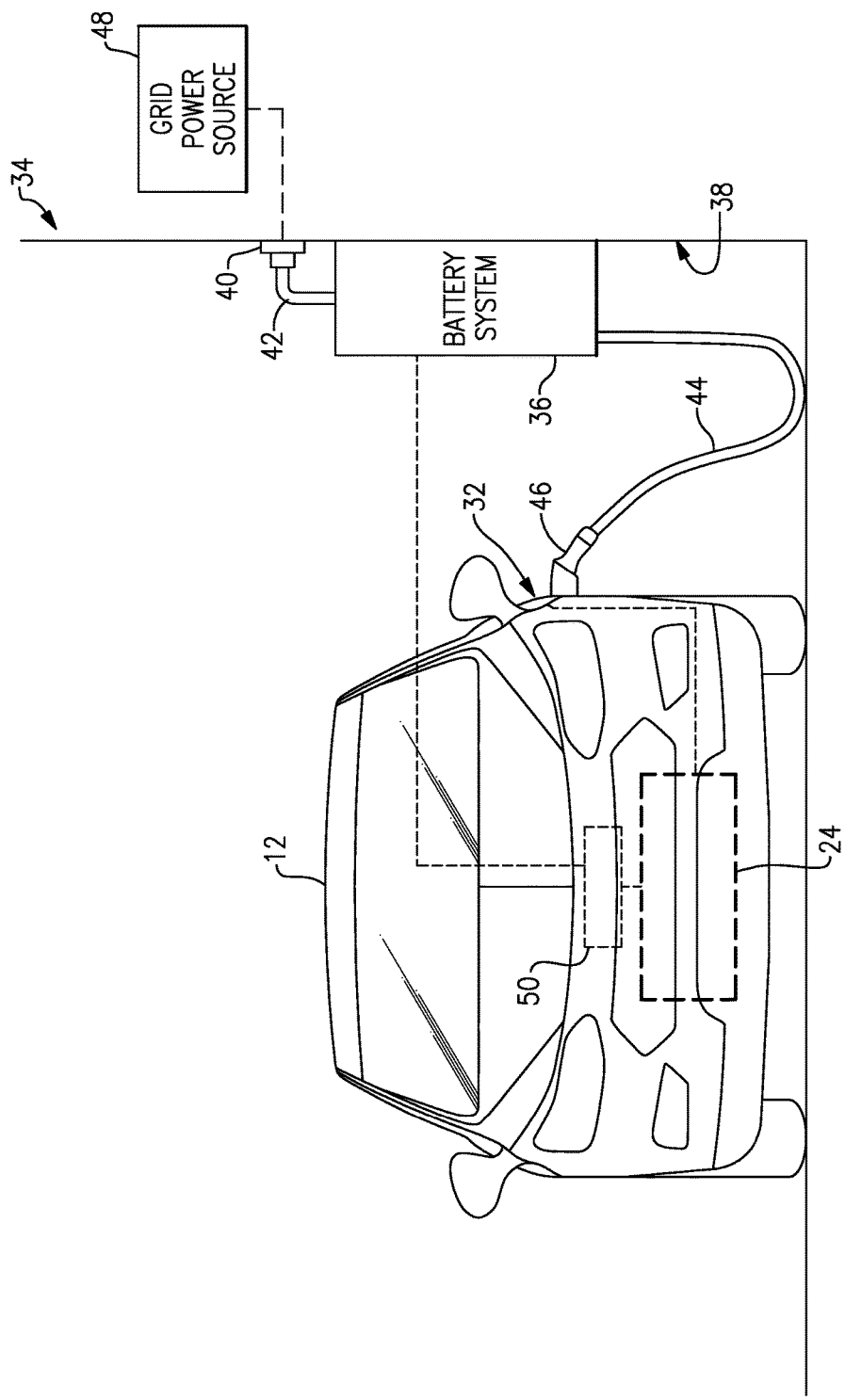
FIG. 2 shows an electrified vehicle incorporating the powertrain of FIG. 1 and located in a charging position relative to a battery system.

FIG. 2 schematically depicts the electrified vehicle 12 of FIG. 1 parked in a charging position near a structure 34. The structure 34 could be a residential building, a commercial building, a parking garage, or any other structure. In a non-limiting embodiment, the structure 34 is a garage located at the home of the owner/operator of the electrified vehicle 12. It should be understood that the various components of FIG. 2 are shown schematically to better illustrate the features of this disclosure and are not necessarily depicted to scale.

A battery system 36 for charging the battery pack 24 of the electrified vehicle 12 may be mounted to a surface 38, such as a wall or a floor, of the structure 34. The battery system 36 may be electrically coupled to a power outlet 40 by a first power cable 42. A second power cable 44 extends between the battery system 36 and the charging port 32 of the electrified vehicle 12. A vehicle coupler 46 of the second power cable 44 is coupled to the charging port 32 to allow power to be transferred from the battery system 36 to the electrified vehicle 12, and more specifically to the battery pack 24 of the electrified vehicle 12.

A grid power source 48 can supply power to the battery system 36 once the first power cable 42 is connected to the power outlet 40. In a non-limiting embodiment, the grid power source 48 is an AC power source that inputs power to the battery system 36 at either 110 volts or 220 volts. The power supplied to the battery system 36 may be stored therein and then selectively used to charge the battery pack 24 of the electrified vehicle 12. Thus, the battery system 36 can be used to charge the battery pack 24 of the electrified vehicle 12 even when power is not available from the grid power source 48. While FIG. 2 illustrates one example battery system arrangement, this disclosure is not limited to the particular arrangement of FIG. 2.

With reference back to FIG. 1, the electrified vehicle 12 includes a controller 50 for monitoring and/or controlling various aspects of the powertrain 10 associated with the electrified vehicle 12. The controller 50, for example, may communicate with the battery pack 24, the charging system 30, and the charging port 32. The controller 50 may also communicate with various other vehicle components and monitor various other vehicle conditions. The controller 50 includes electronics, software, or both, to perform the necessary control functions for operating the electrified vehicle 12.

In one non-limiting embodiment, the controller 50 is a combination vehicle system controller and powertrain control module (VSC/PCM). Although it is shown as a single device, the controller 50 may include multiple controllers in the form of multiple hardware devices, or multiple software controllers with one or more hardware devices. A controller area network 52 (CAN) allows the controller 50 to communicate with the various components of the electrified vehicle 12 as well as the battery system 36. For example, the controller 50 is configured to provide instructions, either directly or indirectly, to the battery system 36 to charge the battery pack 24 consistent with a particular charging profile.

The electrified vehicle 12 also includes a human-machine interface 54. In one example, the human-machine interface 54 is provided in a vehicle cabin 56 (FIG. 3) and is accessible by a user from within the electrified vehicle 12. The human-machine interface 54 is an interactive display, such as a graphical user interface (GUI), in this example. In one particular example, the human-machine interface 54 includes a touchscreen, which is configured to display information to the user and allow the user to provide inputs.

The controller 50 is in communication with the human-machine interface 54. The inputs the user provides to the human-machine interface 54 are interpreted by the controller 50, which then executes operations consistent with the inputs. One example human-machine interface 54 is provided, at least in part, by the SYNC® System offered commercially by Ford Motor Company.

Figure 3:
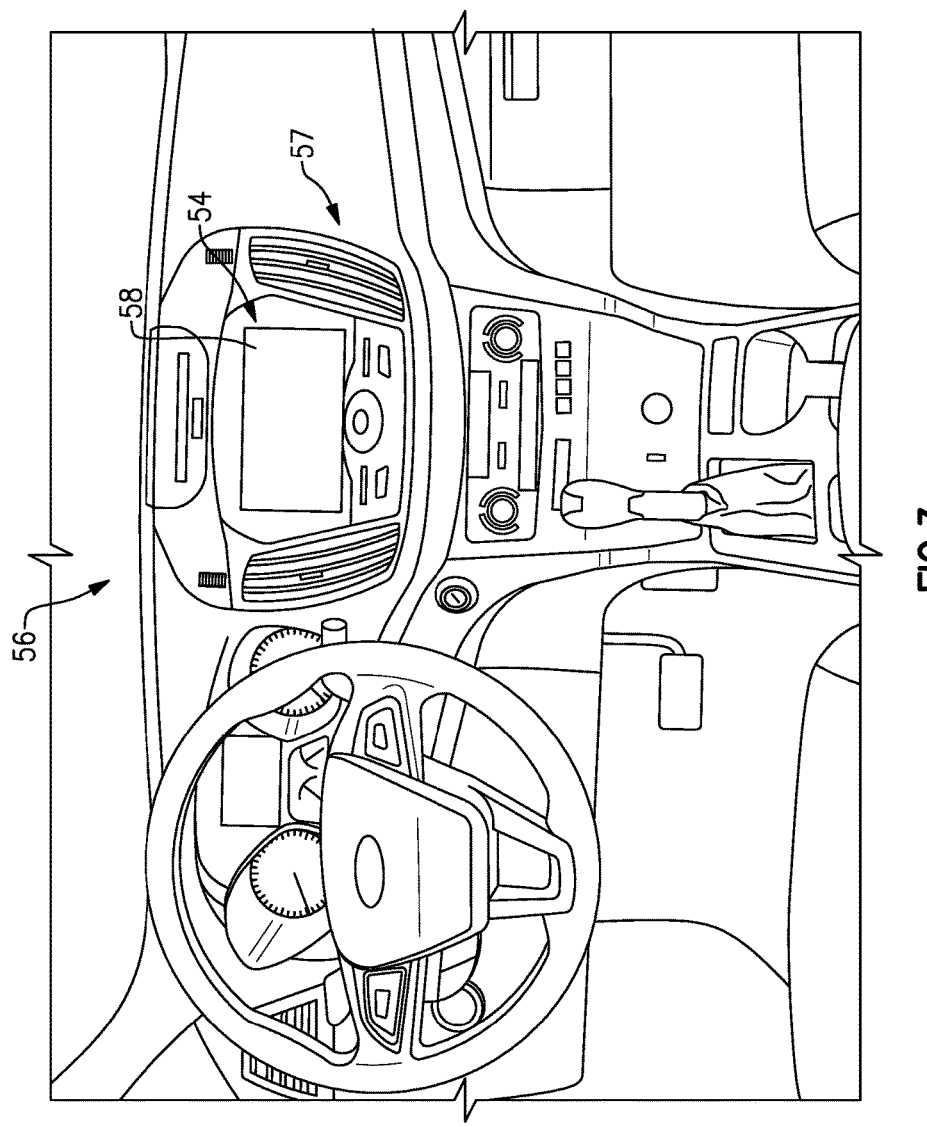
FIG. 3 illustrates an example vehicle cabin, and in particular illustrates an example human-machine interface.

FIG. 3 illustrates an example vehicle cabin 56 and, in particular, illustrates an in-vehicle infotainment (IVI) system 57. The in-vehicle infotainment system 57 includes the human-machine interface 54. The human-machine interface 54 includes a touchscreen 58 configured to display information to a user and allow the user to provide inputs by touching the touchscreen 58. While a touchscreen 58 is shown and described herein, this disclosure is not limited to touchscreens, and extends to other types of human-machine interfaces.

In this disclosure, a user can use the human-machine interface 54 to set a charging profile, which dictates the way in which the battery pack 24 is charged. For example, charging the battery pack 24 can be costly depending on the day of the week or the time of day. In this disclosure, the user sets its charging preferences via the human-machine interface 54, and the controller 50 sends the appropriate signals to the various components of the electrified vehicle 12 and/or the battery system 36 to charge the electrified vehicle 12 consistent with the charging profile. In turn, this disclosure provides a customizable charging profile, which can be set in-vehicle, and which leads to reduced energy costs.

Figure 4:
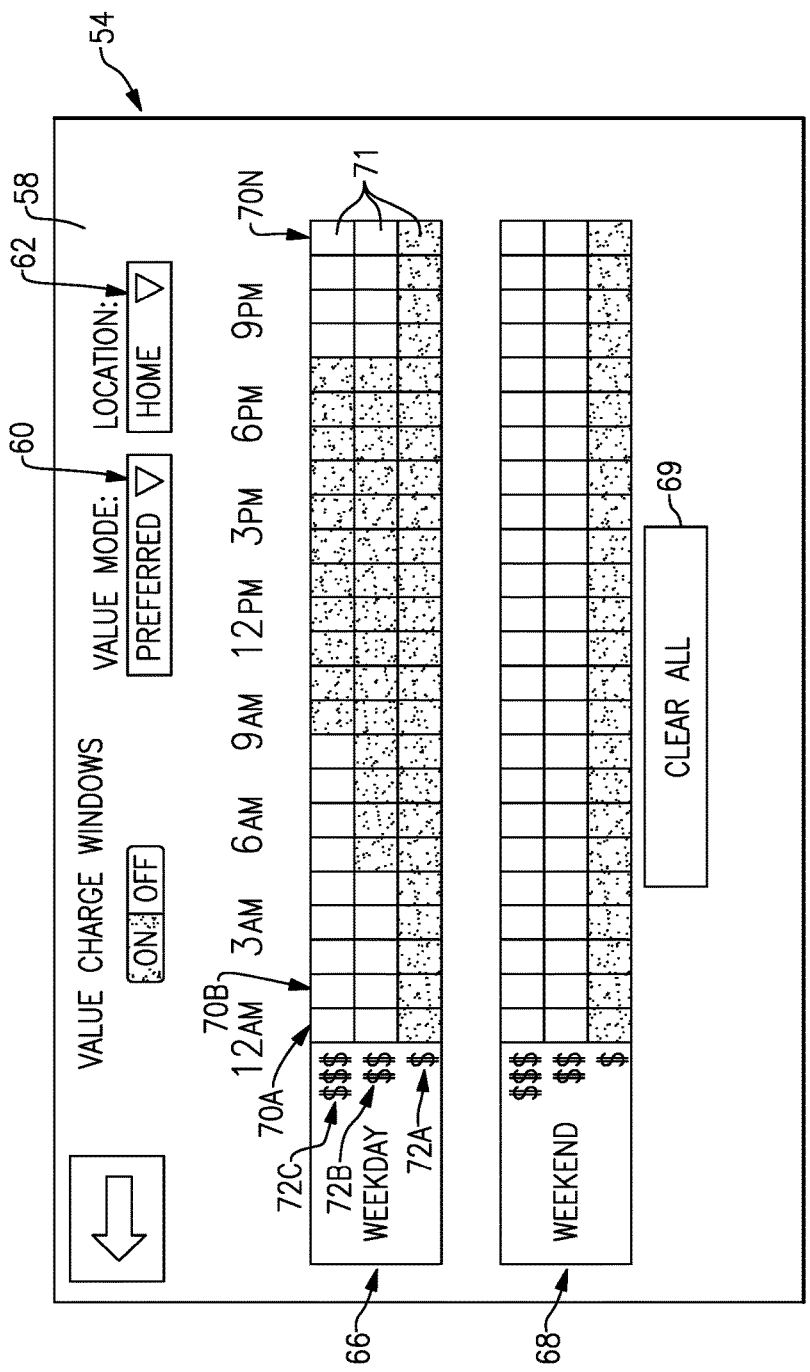
FIG. 4 illustrates an example display arrangement of the human-machine interface.

FIG. 4 illustrates one example display arrangement for the touchscreen 58 of the human-machine interface 54. In FIG. 4, the example arrangement includes a first dropdown menu 60 and a second dropdown menu 62. The first dropdown menu 60 allows the user to select a value charging mode. In this example, there are at least two value charging modes. A first example value charging mode is a "preferred" charging mode, in which a user sets a charging profile based on preferred charging times and electricity costs. In a second example value charging mode, known as a "select" charging mode, the user sets a preferred charging time irrespective of electricity cost.

In the second dropdown menu 62, the user is allowed to set a location corresponding to a particular charging profile. In the illustrated example, the location is "home." The user could select additional locations, such as "cabin," "office," etc. While dropdown menus 60, 62 are shown in FIG. 4, this disclosure is not limited to dropdown menus and extends to any other type of graphical control elements that allow the user to make a particular selection. Additionally, in one example, the electrified vehicle 12 can determine or suggest the location using a global positioning satellite (GPS) system 64 (FIG. 1).

FIG. 4 illustrates the touchscreen 58 when the "preferred" charging mode is selected. The touchscreen 58 includes first and second sets of charging windows 66, 68. The first set of charging windows 66 corresponds to a weekday charging profile. The second set of charging windows 68 corresponds to a weekend charging profile. Within each set of charging windows 66, 68, there are a plurality of columns and rows of cells 71. Each of the plurality of cells 71 can be independently selected and deselected. In the figures, the darkened cells are "selected," while the blank or clear cells are "deselected." Further, while the illustrated example includes only two sets of windows 66, 68 corresponding to the weekdays and the weekend, this disclosure is not limited to display arrangements having only two sets of windows.

With reference to the first set of charging windows 66, there are a number columns, 70A-70N, where "N" corresponds to a particular number of columns. In this example, there are twenty-four columns, with one column representing each hour of the day. In this example, the first column 70A corresponds to a time between 12:00 A.M. (midnight) to 1:00 A.M. The second column 70B corresponds to a time between 1:00 A.M. and 2:00 A.M., and so on. While in this example there are twenty-four columns, this disclosure extends to examples having a different number of columns.

Further, in this example, the first set of charging windows 66 includes three rows 72A, 72B, and 72C. The first, second, and third rows 72A-72C correspond to the expected cost of electricity. The first row 72A, in this example, corresponds to the least expensive electricity cost, whereas the third row 72C corresponds to the most expensive. The second row 72B corresponds to an intermediate cost. While FIG. 4 includes three rows 72A-72C, this disclosure is not limited to arrangements having three rows.

The pricing information corresponding to the rows 72A, 72B, and 72C may be based on information received by the electrified vehicle 12 in real-time from an energy company or news service, as examples. Alternatively, the pricing information can be an estimated price based on previous charging activity, such as the previous week or month of charging. The GPS 64 can be used to retrieve relevant pricing information. For example, electricity prices may vary between a user's home, office, and cabin.

While not described herein for the sake of brevity, the second set of charging windows 68, which correspond to a weekend charging profile in this example, are arranged similarly to the first set of charging windows 66. Additionally, the touchscreen arrangement may include a "clear all" button 69 configured to reset all selected cells. The touchscreen 58 may also display other information such as time to full charge and current battery state of charge (SOC).

As will be discussed in detail below, the user can use the human-machine interface 54 to set the charging profiles for electrified vehicle. The user can set charging profiles in both "preferred" and "select" charging modes, and can assign those profiles to a particular location.

Figure 5:
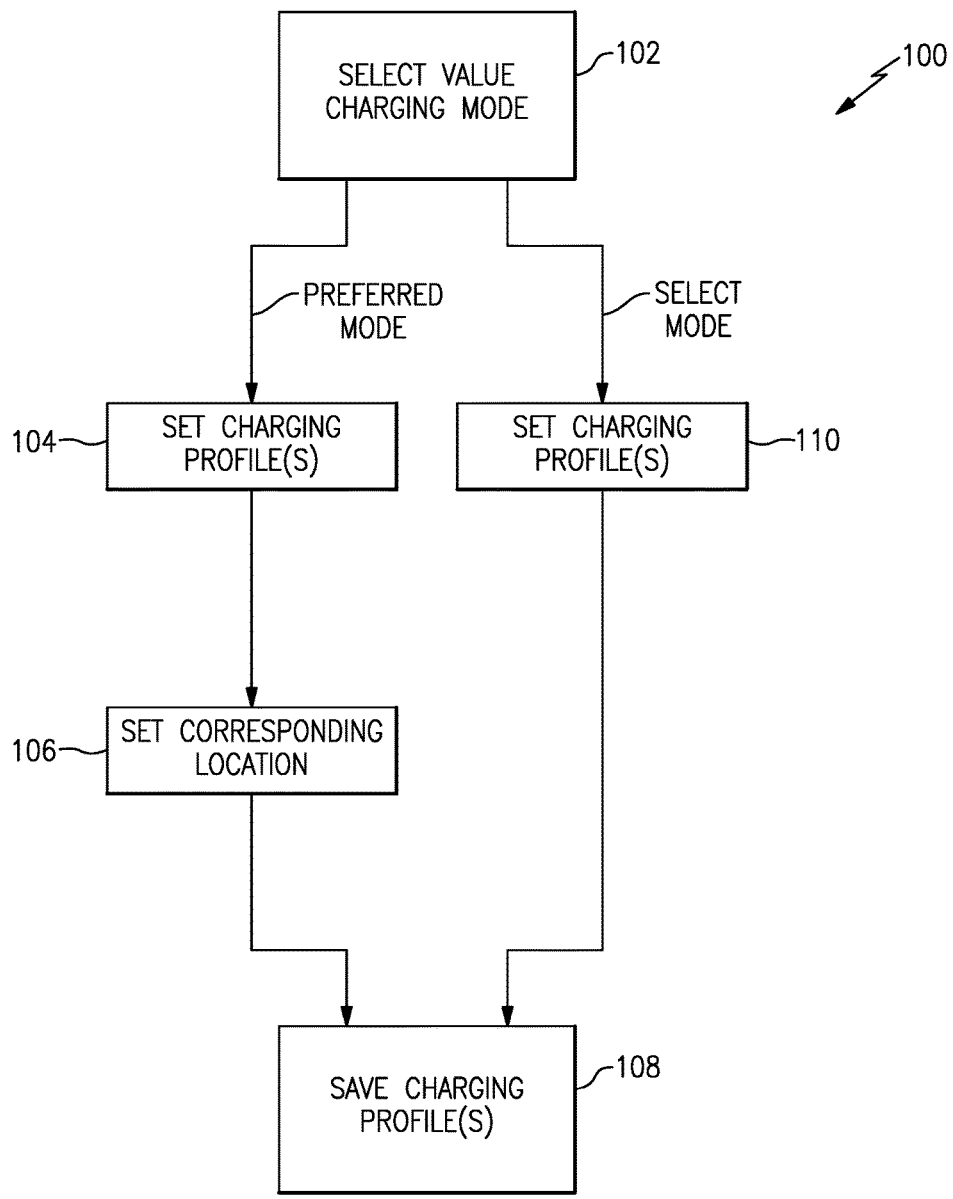
FIG. 5 is a flow chart representative of a first aspect of a method of this disclosure.

FIG. 5 illustrates an aspect of a method 100 for setting the charging profiles according to this disclosure. In the method 100, a user first selects the value charging mode, at 102, using the first dropdown menu 60. As discussed, example charging modes include at least a "preferred" charging mode and a "select" charging mode.

Figure 6A:
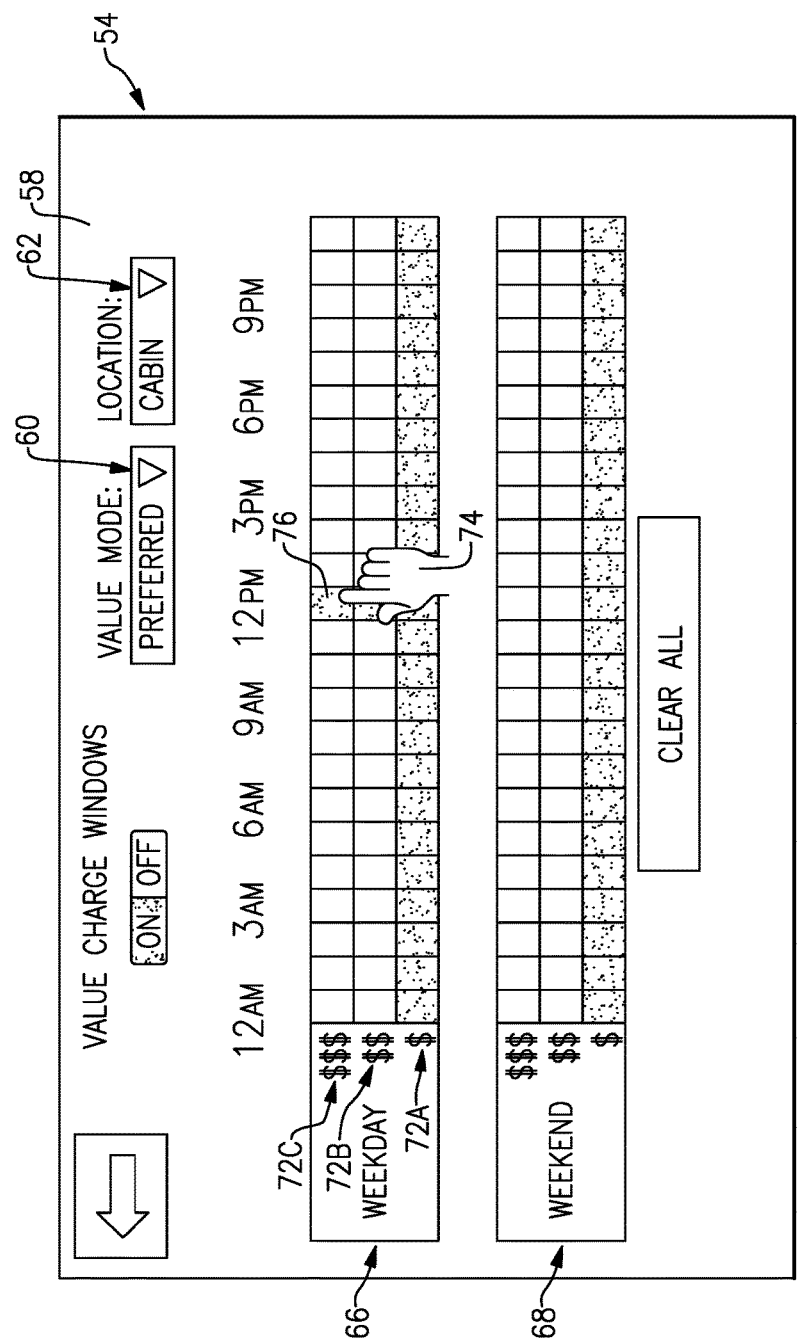
FIG. 6A illustrates the example human-machine interface as the user sets a "preferred" value charging mode.

Within the "preferred" charging mode, a user sets one or more "preferred" charging profiles, at 104. With reference to FIG. 6A, the default "preferred" charging profile allows charging during all time periods when the least expensive electricity is available. With reference to the first set of charging windows 66, all cells within the first row 72A are selected. Thus, in the default "preferred" charging profile, the battery pack 24 will be charged whenever plugged-in and when inexpensive electricity is available. There may be other default "preferred" charging profiles in other examples.

The user may set a "preferred" charging profile by either accepting the default "preferred" charging profile or by further customizing the charging profile. In the example of FIG. 6A, the user has decided to set a customized "preferred" charging profile. In FIG. 6A, the user uses their hand (or finger) 74 or other input device to activate a particular cell within the first set of charging windows 66. In this example, the user selects a cell 76 corresponding to the time between 12:00 P.M. and 1:00 P.M. The cell 76 is in row 72C, corresponding to the most expensive electricity cost.

In general, users typically prefer if the vehicle does not charge during the 12:00 to 1:00 PM time frame, for example, due to its higher energy cost. Thus, in one example, the controller 50 prioritizes charging in the lower cost windows and will only charge in the 12:00 to 1:00 higher energy cost time frame, if the total charge time is greater than the lower cost window range prior to the next usage time. In other words, charging in the 12:00 to 1:00 time frame would still occur if necessary to assure full, or substantially full, battery state of charge (SOC) by the Next Usage Time (NUT). In one example, the first priority controller 50 is to fully charge the battery by the NUT, and the second priority is to charge at the lowest energy cost possible.

Figure 6B:
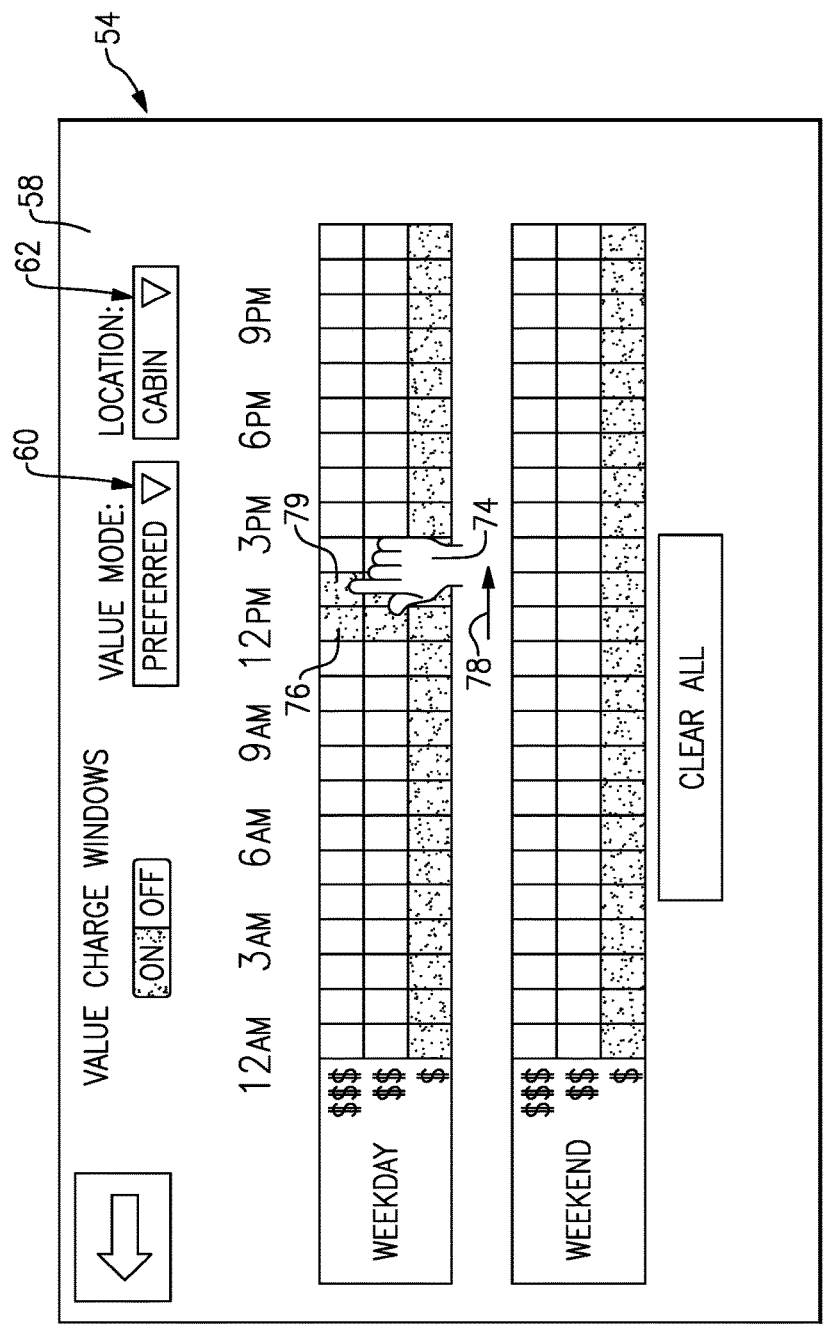
FIG. 6B illustrates the example human-machine interface as the user sets a "preferred" value charging mode.
Figure 6C:
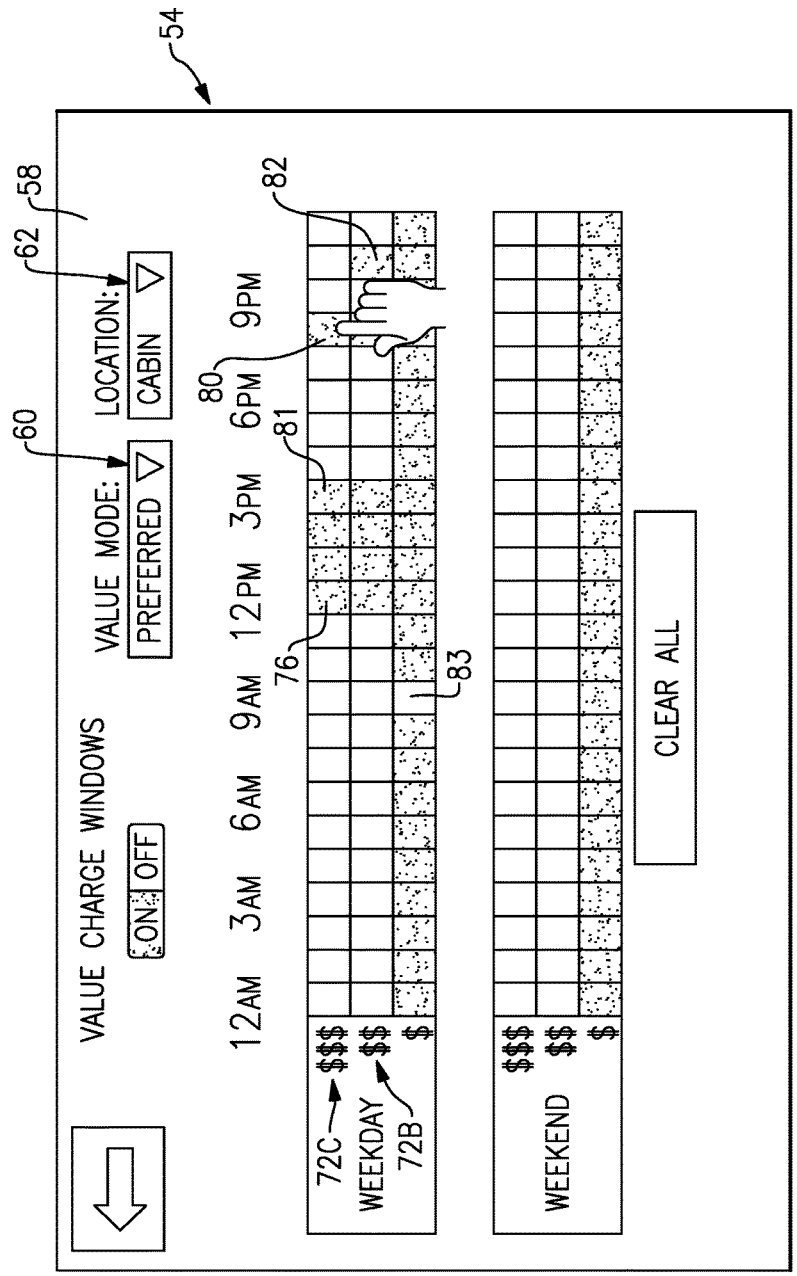
FIG. 6C illustrates the example human-machine interface as the user sets a "preferred" value charging mode.

In this example, the user can continue defining the preferred charging profile using the familiar functionality of the touchscreen 58. For example, the user can use their hand 74 to click on the first cell 76 and continue dragging their hand 74 to select additional cells. With reference to FIGS. 6B-6C, the user has dragged their hand 74 in the direction 78 (to the right, relative to FIG. 6B-6C) from the first cell 76 to a second cell 79, and ultimately to a fourth cell 81. Thus, the user has selected a time between 12:00 and 4:00 P.M. where the battery pack will avoid being charged to save money, as long as the SOC will be at a desired target by the user set NUT.

In FIG. 6C the user has also selected additional cells. In this example, the user has selected cell 80 corresponding to the time between 8:00 and 9:00 P.M., where the user has selected the most expensive cost. The user has selected yet another cell 82, corresponding to a time between 10:00-11:00 P.M, where the user has selected an intermediate cost. If the vehicle was plugged into a battery system 36 at 8:00 P.M, while the next usage time was set to 11 P.M. and the vehicle requires two hours to fully charge, then the battery will not start charging until 9:00 PM and will continue till 11 P.M., thus avoiding the highest cost window and charging during a lowest and intermediate cost window to meet the customers NUT in a cost effective manner. Additionally, the user has deselected cell 83, because the user does not want any charging to occur between 9:00-10:00 A.M.

Once the desired charging windows are selected, the user also sets the location corresponding to these selections, at 106. As shown in FIG. 6C, the user has selected "cabin" as the location, using the second dropdown menu 62. Alternatively, the GPS 64 could be used to set, or suggest, the location. When the user is done designating the charging time and cost preferences, the charging profile is then saved, at 108. The controller 50 can later retrieve that charging profile. In some examples, the controller 50 uses information from the GPS 64 to selectively retrieve saved profiles corresponding to the location of the electrified vehicle 12. Additionally, it should be understood that more than one charging profile can be saved per location.

In the "select" charging mode, the user desires to charge battery pack 24 at a particular time regardless of electricity cost. At step 110, the user can set a "select" charging profile by choosing "select" from the first dropdown menu 60. In the "select" mode, the second dropdown menu 62 may fade away because, in some examples, the user is not concerned with the location of the electrified vehicle 12 when charging in the "select" mode. In other examples, a location is correlated to a particular select charging profile similar to step 106.

Figure 7A:
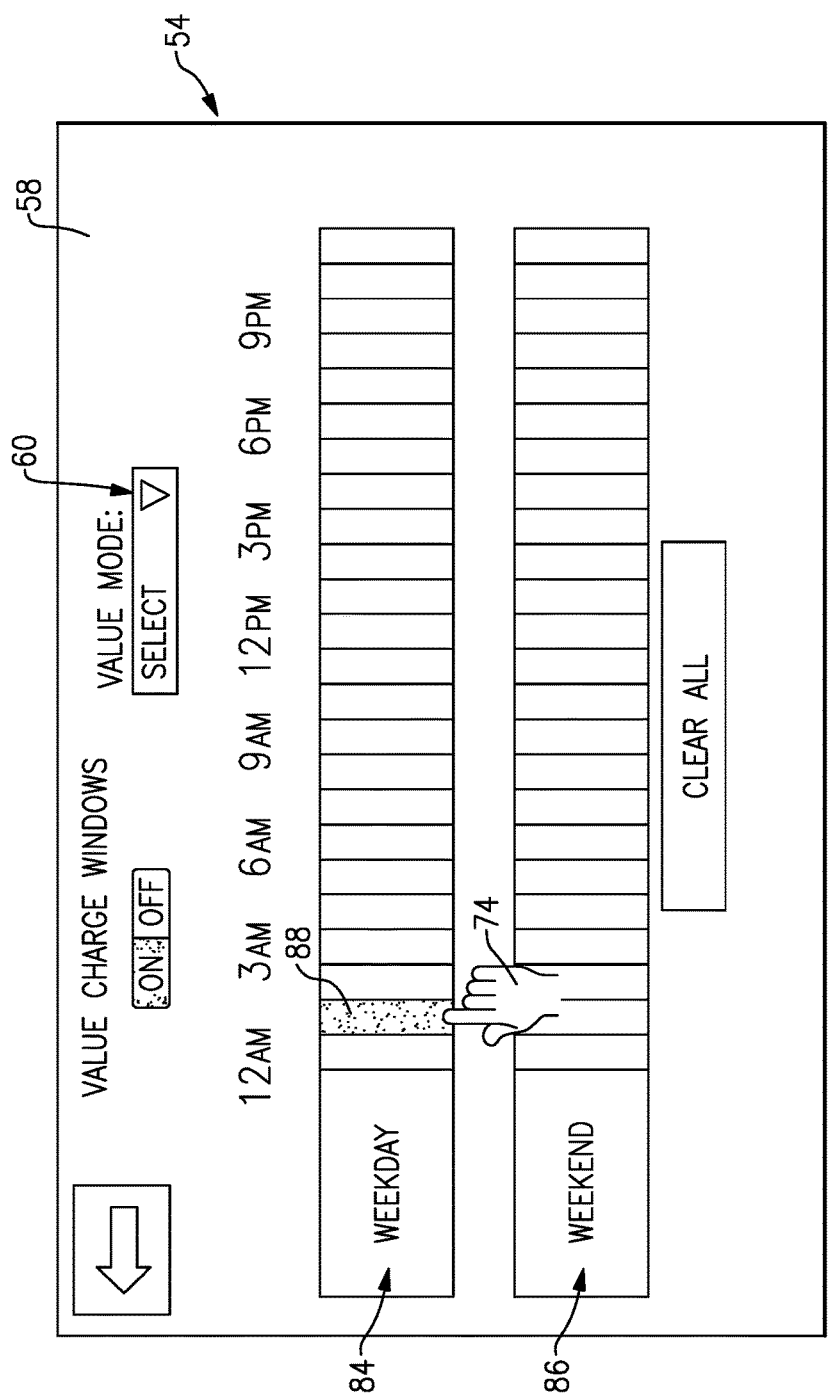
FIG. 7A illustrates the example human-machine interface as the user sets a "select" value charging mode.
Figure 7B:
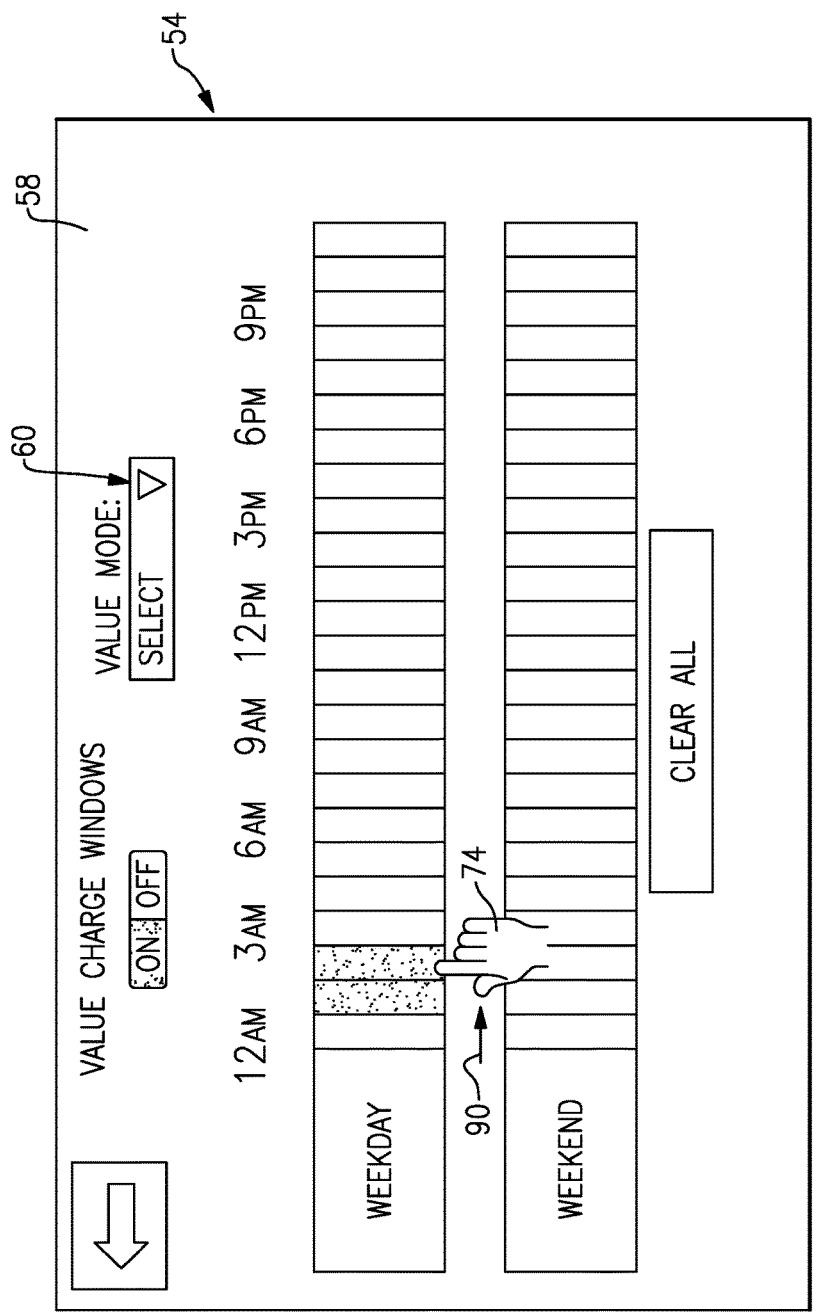
FIG. 7B illustrates the example human-machine interface as the user sets a "select" value charging mode.
Figure 7C:
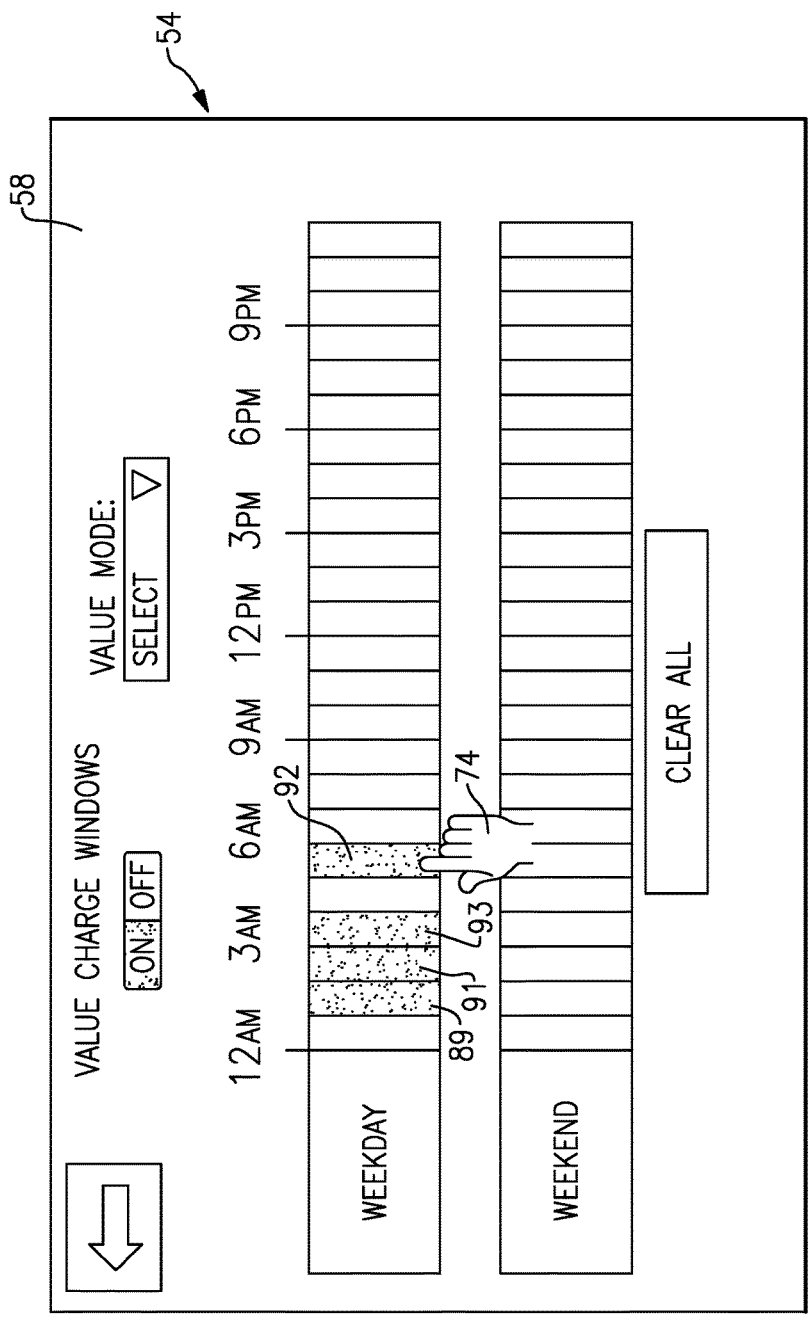
FIG. 7C illustrates the example human-machine interface as the user sets a "select" value charging mode.

FIG. 7A illustrates an example arrangement of the human-machine interface 54 when the user sets a "select" charging profile. In this example, there is a first set of windows 84 and a second set of windows 86, corresponding to weekdays and the weekend, respectively. In one example, a user selects a first cell 88, in this example, corresponding to the time between 1:00 and 2:00 A.M. Like in the prior example, the user can click and drag their hand 74 to select additional cells by moving their hand 74 in the direction 90, as illustrated in FIG. 7B. As shown in FIG. 7C, the user has dragged its hand 74 to select a group of three cells 89, 91, 93 representing a charging time between 1:00 to 4:00 A.M., and has selected an additional cell 92 corresponding to the time between 5:00 and 6:00 A.M. When the user is done setting the charging time preferences, the charging profile is then saved, at 108. In the "select" value charging mode, the battery pack 24 will charge at these times regardless of electricity cost.

Figure 8:
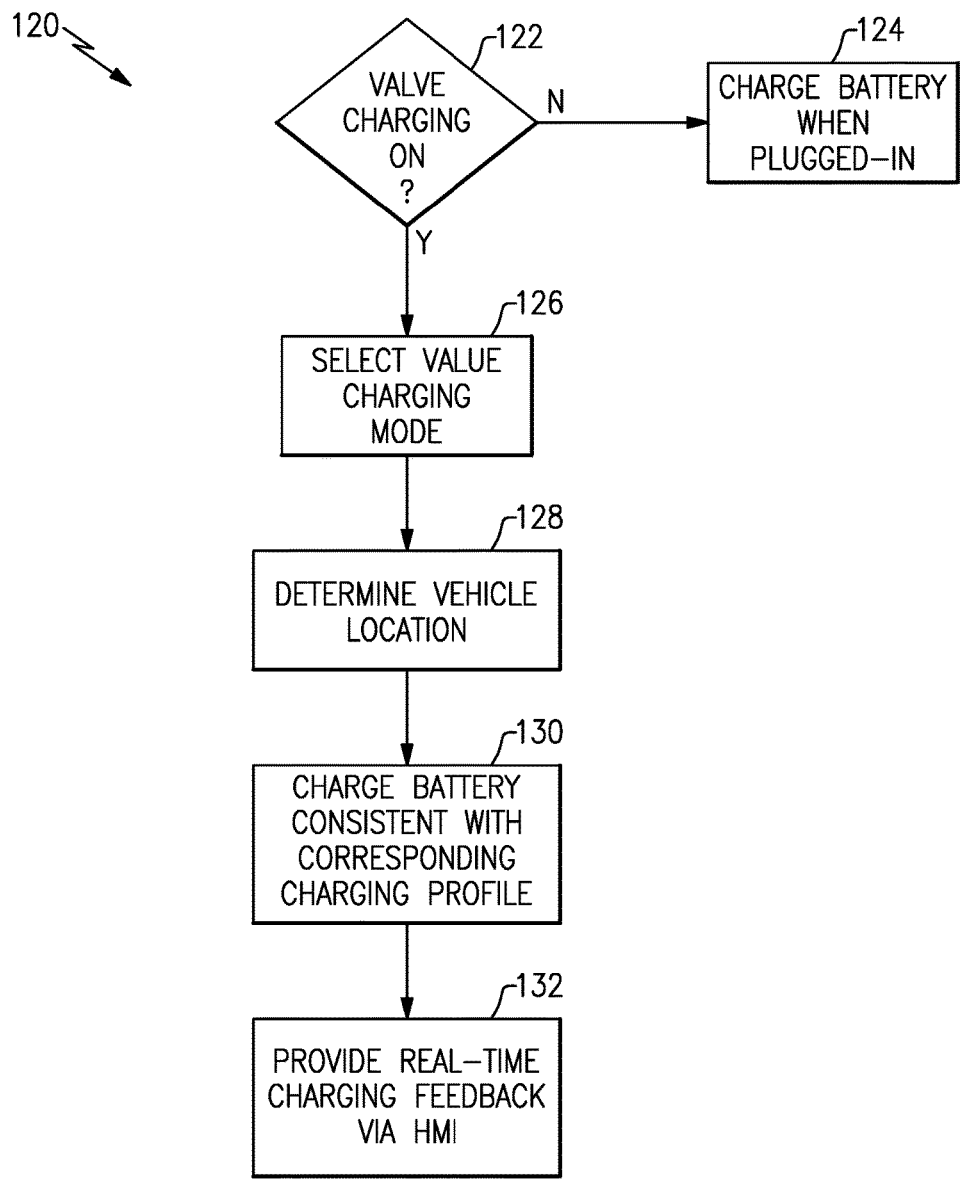
FIG. 8 is a flow chart representative of a second aspect of a method of this disclosure.

FIG. 8 includes a flowchart representative of another aspect of a method 120 of this disclosure. Using the method 120, the battery pack 24 is charged consistent with a charging profile set and saved in the method 100.

Initially, in the method 120, the user uses the human-machine interface 54 to select whether to charge the electrified vehicle 12 using a value charging mode, at 122. If the user does not desire to charge the battery pack 24 using value charging, the vehicle charges the battery pack 24 whenever the vehicle is plugged into the battery system 36, at 124.

If value charging is selected, the user next selects a particular value charging mode, at 126. Again, example charging modes include the "preferred" charging mode and the "select" charging mode. The user can also set the vehicle location, at 128, or the electrified vehicle 12 can determine the vehicle location using the GPS 64, at 128. Based on the charging mode and vehicle location, the controller 50 will retrieve the appropriate charging profile, which was saved in step 108. If there is more than one profile saved for a particular location, the human-machine interface 54 will prompt the user to make a further selection.

Once a charging profile is selected, the controller 50 instructs the battery system 36, either directly or indirectly, to charge the battery pack 24 consistent with the appropriate charging profile, at 130. During charging, the human-machine interface 54 displays charging activity, at 132. The charging activity may include charging information, such as a graphical display of the currently-selected charging profile, state of charge (SOC), and estimated time to completion.

By displaying the charging profile information during charging, it is clear to the user whether the vehicle is charging at a particular time, and why. This eliminates confusion sometimes brought about by when a charging profile is set remotely, such as by a user's laptop or smartphone. In those cases, the user may forget that a particular charging profile was selected and become confused as to why the vehicle is either charging or not charging at a particular time. Further, by providing the ability to set charging profiles in-vehicle, the user is more likely to take advantage of charging profile functionality, because the user does not need to log into a separate device to set a charging profile.

This disclosure provides an intuitive, in-vehicle system allowing the user to set one or more particular charging profiles. The system provides real-time feedback as to charging information, which reduces user confusion as to why the vehicle is charging at a particular time.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
   a battery pack, a human-machine interface configured to receive inputs setting a charging profile, and a controller; and
   a battery system configured to selectively charge the battery pack in response to an instruction from the controller, the controller configured to instruct the battery system to charge the battery pack consistent with the charging profile, wherein:
   the human-machine interface is configured to receive inputs setting the charging profile based on both an electricity cost preference and a charging time preference,
   wherein the human-machine interface includes at least one set of charging windows having a plurality of cells arranged in columns and rows, the columns corresponding to one of charging times and electricity cost, and the rows corresponding to the other of charging times and electricity cost, and
   the inputs setting the charging profile include a selection of at least one cell corresponding to a desired charging time and electricity cost.

2. The electrified vehicle as recited in claim 1, wherein the human-machine interface is configured to receive an input of vehicle location.

3. The electrified vehicle as recited in claim 1, further comprising a global positioning system (GPS), wherein the control unit instructs the battery system to charge the battery pack based on a charging profile associated with the vehicle location as determined by information from the GPS.

4. The electrified vehicle as recited in claim 1, wherein the human-machine interface displays real-time charging information.

5. The electrified vehicle as recited in claim 1, wherein the battery system is electrically coupled to a power grid.

6. A method, comprising:
   setting a charging profile using a human-machine interface of an electrified vehicle based on both an electricity cost preference and a charging time preference, wherein the human-machine interface includes at least one set of charging windows having a plurality of columns corresponding to one of charging times and electricity cost, and further having a plurality of rows corresponding to the other of charging times and electricity cost, and wherein setting the charging profile includes selecting at least one cell by clicking the at least one cell on a touchscreen; and
   charging a battery pack based on the charging profile.

7. A method, comprising:
   setting a charging profile using a human-machine interface of an electrified vehicle by clicking a cell on a touchscreen and dragging to select additional cells based on electricity cost and charging time preferences, wherein the human-machine interface includes at least one set of charging windows including columns corresponding to charging times and rows corresponding to electricity cost; and
   charging a battery pack based on the charging profile.

8. The method as recited in claim 6, further comprising displaying real-time charging information in-vehicle using the human-machine interface.

9. The electrified vehicle as recited in claim 1, wherein the human-machine interface is provided in a cabin of the electrified vehicle.

10. The electrified vehicle as recited in claim 1, wherein an infotainment system of the electrified vehicle includes the human-machine interface.

11. The method as recited in claim 6, wherein the human-machine interface is provided in a cabin of the electrified vehicle.

12. The method as recited in claim 6, wherein an infotainment system of the electrified vehicle includes the human-machine interface.

13. The method as recited in claim 6, wherein, after the at least one cell is selected by clicking on the at least one cell on the touchscreen, setting the charging profile further includes dragging to select additional cells based on electricity cost and charging time preferences.

* * * * *